(12) United States Patent
Wittmann et al.

(10) Patent No.: US 6,461,732 B1
(45) Date of Patent: Oct. 8, 2002

(54) COMPOSITES CONSISTING OF POLYURETHANE AND A THERMOPLASTIC MATERIAL CONTAINING AN INORGANIC POLAR ADDITIVE

(75) Inventors: Dieter Wittmann, Leverkusen; Thomas Eckel, Dormagen; Bernd Keller, Geldern; Wolfgang Raschilas, Lüdenscheid, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/529,707

(22) PCT Filed: Oct. 7, 1998

(86) PCT No.: PCT/EP98/06373

§ 371 (c)(1),
(2), (4) Date: Apr. 17, 2000

(87) PCT Pub. No.: WO99/20464

PCT Pub. Date: Apr. 29, 1999

(30) Foreign Application Priority Data

Oct. 20, 1997 (DE) .......................... 197 46 265

(51) Int. Cl.$^7$ .......................... C08G 18/06; B32B 27/40
(52) U.S. Cl. ............... 428/412; 428/423.1; 428/423.5; 428/423.7; 428/424.2; 428/425.9; 428/441; 521/142; 521/146; 521/155; 521/182; 521/183

(58) Field of Search .............................. 428/412, 423.1, 428/423.5, 423.7, 424.2, 425.9, 441; 521/142, 146, 155, 182, 183

(56) References Cited

U.S. PATENT DOCUMENTS

| | | | | |
|---|---|---|---|---|
| 5,447,789 A | * | 9/1995 | Griffin | 428/308.4 |
| 5,639,546 A | * | 6/1997 | Bilkadi | 428/331 |
| 5,726,001 A | * | 3/1998 | Eichorst | 430/501 |
| 6,200,680 B1 | * | 3/2001 | Takeda et al. | 423/111 |

FOREIGN PATENT DOCUMENTS

| | | | |
|---|---|---|---|
| EP | 0212559 | * | 3/1987 |
| EP | 0219977 | * | 4/1987 |
| JP | 06262714 | * | 9/1994 |
| WO | WO-A-9509200 | * | 4/1995 |

* cited by examiner

Primary Examiner—John M. Cooney, Jr.
(74) Attorney, Agent, or Firm—Joseph C. Gil; Aron Preis; James R. Franks

(57) ABSTRACT

Composites of at least two different plastics materials joined directly to one another, wherein
A) is a thermoplastic polymer or a thermoplastic mixture of polymers which contain at least one polar compound of at least one of the metals of the 1st to the 5th main group or of the 1st to 8th subsidiary group of the Periodic System as an extremely finely divided powder, and
B) is polyurethane.

18 Claims, No Drawings

COMPOSITES CONSISTING OF POLYURETHANE AND A THERMOPLASTIC MATERIAL CONTAINING AN INORGANIC POLAR ADDITIVE

The invention relates to composites of at least 2 different plastics materials joined directly to one another, one material of which is composed of at least one thermoplastic polymer which contains polar compounds of metals of the 1st to the 5th main group or of the 1 st to the 8th subsidiary group of the Periodic System as an extremely fine particle inorganic powder, and the other material is made of polyurethane.

It is known that composites of a thermoplastic material and a polyurethane, particularly a polyurethane foam material, do not have sufficient bond adhesion. As there is an increasing desire in the motor vehicle industry to use composite materials whose bond adhesion is capable of withstanding even extreme temperature variations, yet the fewest possible different materials should be used on account of recycling requirements, the object of the present invention was to improve sufficiently the bond adhesion of thermoplastic materials joined directly to one another with polyurethane.

SUMMARY OF THE INVENTION

The object according to the invention is achieved by composites which are composed of at least two different plastics materials joined directly to one another, of which
A) is a thermoplastic polymer or a mixture of thermoplastic polymers which contain at least one polar compound of at least one of the metals of the 1st to the 5th main group or of the 1st to the 8th subsidiary group of the Periodic System as an extremely fine particle inorganic powder, and
B) is polyurethane.

The composite materials may be prepared in a known way. The composite part is preferably produced beforehand from thermoplastic polymers and the polyurethane reaction system applied to it and reacted. Depending on the reactivity of the polyurethane reaction components, these may already be premixed or mixed in a known way during application. Application takes place preferably by spraying, knife coating or calendering. It is also possible, however, to prepare the composites according to the invention by coextrusion according to known methods.

DETAILED DESCRIPTION OF THE INVENTION

Suitable thermoplastic materials are all well known thermoplastics, preferably thermoplastic polyolefins, polycarbonates, polyester carbonates, polyesters, styrene copolymers, optionally rubber-containing graft (co) polymers such as ABS polymers, polyamides and/or thermoplastic mixtures thereof.

In preference, the following polymers are suitable as thermoplastic material A:

Polyolefins according to the invention are polymers of aliphatic unsaturated hydrocarbons such as, for example, ethylene, propylene, butylene or isobutylene which are obtained by conventional processes, e.g. free radical polymerisation, and have average weight-average molecular weights $\overline{M}_w$ (measured by gel chromatography methods) of between 5,000 and 3,000,000. Both low density and high density polyolefin are suitable. The unsaturated hydrocarbons may also be copolymerised in a known way with other vinyl monomers such as, e.g. vinyl acetate, acrylic acid or acrylic acid ester, the proportion of vinyl monomers being a maximum of 30 wt. %, preferably up to 25 wt. %.

Polyethylene and polypropylene are preferred.

Suitable thermoplastic polymers according to the invention are also thermoplastic aromatic polycarbonates, particularly those based on diphenols corresponding to formula (I)

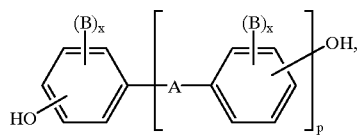

(I)

wherein
A means a single bond, $C_1$–$C_5$-alkylene, $C_2$–$C_5$-alkylidene, $C_5$–$C_6$-cycloalkylidene, —S—, —$SO_2$—, —O—, —CO— or $C_6$–$C_{12}$-arylene, which may optionally be condensed with further aromatic rings containing heteroatoms,
B independently of one another, means halogen, preferably chlorine, bromine, $C_1$–$C_8$-alkyl, $C_6$–$C_{10}$-aryl, preferably phenyl, $C_7$–$C_{12}$-aralkyl, preferably benzyl,
x independently of one another, means 0, or 2 in each case, and
p means 1 or 0,
or alkyl-substituted dihydroxyphenylcycloalkanes corresponding to formula (II)

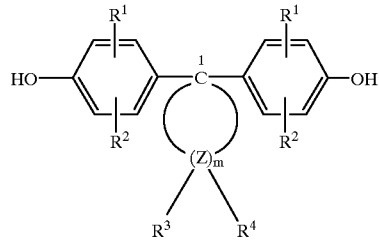

(II)

wherein
$R^1$ and $R^2$, independently of one another, mean hydrogen, halogen, preferably chlorine or bromine, $C_1$–$C_8$-alkyl, $C_5$–$C_6$-cycloalkyl, $C_6$–$C_{10}$-aryl, preferably phenyl and $C_7$–$C_{12}$-aralkyl, preferably phenyl-$C_1$-$C_4$-alkyl, particularly benzyl,
m is an integer from 4 to 7, preferably 4 or 5,
$R^3$ and $R^4$, which may be chosen individually for each Z, independently of one another, mean hydrogen or $C_1$–$C_6$-alkyl, preferably hydrogen, methyl or ethyl,
and
Z means carbon, provided that on at least one atom Z $R^3$ and $R^4$ at the same time mean alkyl.

Suitable diphenols having the formula (1) are e.g. hydroquinone, resorcinol, 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, 2,2-bis-(3-chloro-4-hydroxyphenyl)propane, 2,2-bis-(3,5-dibromo-4-hydroxyphenyl)propane.

Preferred diphenols having formula (I) are 2,2-bis-(4-hydroxyphenyl)propane, 2,2-bis-(3,5-dichloro-4-hydroxyphenyl)propane and 1,1-bis-(4-hydroxyphenyl) cyclohexane.

Preferred diphenols having formula (II) are dihydroxy-diphenylcycloalkanes with 5 and 6 ring-carbon atoms in the cycloaliphatic radical (m=4 or 5 in formula (I)) such as, for example, the diphenols corresponding to the formulae

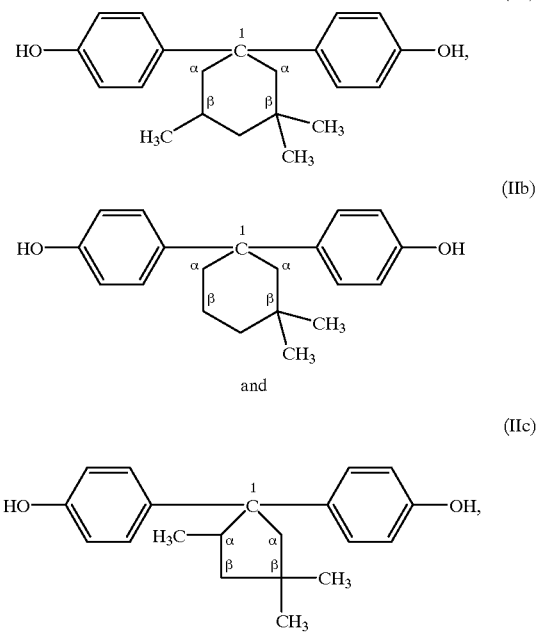

1,1-bis-(4-hydroxyphenyl)-3,3,5-trimethylcyclohexane (formula (IIa) being particularly preferred.

The polycarbonates suitable according to the invention may be branched in a known way, preferably by the incorporation of 0.05 to 2.0 mole-%, based on the sum of the diphenols used, of trifunctional or more than trifunctional compounds, e.g. those with three or more than three phenolic groups, for example
phloroglucinol,
4,6-dimethyl-2,4,6-tri-(4-hydroxyphenyl)heptene-2,
4,6-dimethyl-2,4,6-tri-(4-hydroxyphenyl)heptane,
1,3,5-tri-(4-hydroxyphenyl)benzene,
1,1,1-tri-(4-hydroxyphenyl)ethane,
tri-(4-hydroxyphenyl)phenylmethane,
2,2-bis-(4,4-bis-(4-hydroxyphenyl)-cyclohexyl)propane,
2,4-bis-(4-hydroxyphenyl)-isopropyl)phenol,
2,6-bis-(2-hydroxy-5'-methylbenzyl)-4-methylphenol,
2-(4-hydroxyphenyl)-2-(2,4-dihydroxyphenyl)propane,
hexa-(4-(4-hydroxyphenylisopropyl)-phenyl)-orthoterephthalate,
tetra-(4-hydroxyphenyl)methane,
tetra-(4-(4-hydroxyphenylisopropyl)-phenoxy)methane, and
1,4-bis-((4',4"-dihydroxytriphenyl)-methyl)benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindol.

Preferred polycarbonates, apart from the bisphenol A-homopolycarbonate, are the copolycarbonates of bisphenol A with up to 15 mole-%, based on the mole sums of diphenols, of 2,2-bis-(3,5-dibromo-4-hydroxyphenyl) propane.

The aromatic polycarbonates used as component A may be partially exchanged by aromatic polyester carbonates.

Aromatic polycarbonates and/or aromatic polyester carbonates according to component A are known from the literature or may be prepared according to processes known from the literature (for the preparation of aromatic polycarbonates see, for example, Schnell, "Chemistry and Physics of Polycarbonates", Interscience Publishers, 1964, and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates, e.g. DE-OS 3 007 934).

The preparation of aromatic polycarbonates and/or aromatic polyester carbonates may take place, e.g. by reaction of diphenols with carbonic acid halides, preferably phosgene and/or with aromatic dicarboxylic acid dihalides, preferably benzene dicarboxylic acid dihalides, according to the interphase process, optionally using chain terminating agents and optionally using trifunctional or more than trifunctional branching agents.

Moreover, styrene (co)polymers of one or at least two ethylenically unsaturated monomers (vinyl monomers) are suitable as thermoplastic material, such as, for example, styrene, α-methylstyrene, ring-substituted styrenes, acrylonitrile, methacrylonitrile, methylmethacrylate, maleic anhydride, N-substituted maleinimides and (meth)acrylic acid alkyl esters with 1 to 18 carbon atoms.

The (co)polymers are resin-like, thermoplastic and rubber-free.

Preferred styrene (co)polymers are those of at least one monomer from the series comprising styrene, α-methylstyrene and/or ring-substituted styrenes with at least one monomer from the series comprising acrylonitrile, methacrylonitrile, methylmethacrylate, maleic anhydride and/or N-substituted maleinimide.

Particularly preferred weight ratios in the thermoplastic copolymer are 60 to 100 wt. % of the styrene monomers and 40 to 0 wt. % of the other vinyl monomers. Particularly preferred (co)polymers are those of styrene with acrylonitrile and optionally with methylmethacrylate, of α-methylstyrene with acrylonitrile and optionally with methylmethacrylate, or of styrene and α-methylstyrene with acrylonitrile and optionally with methylmethacrylate.

The (co)polymers are well known and may be prepared by free radical polymerisation, particularly by emulsion, suspension, solution or bulk polymerisation. The (co) polymers preferably have molecular weights $\overline{M}_w$ (weight-average, determined by light scattering or sedimentation) of between 15,000 and 200,000.

Particularly preferred (co)polymers are also random (co) polymers of styrene and maleic anhydride, which may be prepared preferably by a continuous bulk or solution polymerisation with incomplete conversions from the corresponding monomer.

The proportions of both components of the random styrene-maleic anhydride copolymers suitable according to the invention may vary widely. The preferred maleic anhydride content is 5 to 25 wt. %.

Instead of styrene, the polymers may also contain ring-substituted styrenes, such as p-methylstyrene, 2,4-dimethylstyrene and other substituted styrenes, such as α-methylstyrene.

The molecular weights (number-average $\overline{M}_n$) of styrene-maleic anhydride copolymers may vary widely. The range from 60,000 to 200,000 is preferred. A limiting viscosity number of 0.3 to 0.9 is preferred for these products (measured in dimethylformamide at 25° C.; see Hoffmann, Krömer, Kuhn, Polymeranalytik I, Stuttgart 1977, page 316 ff).

Suitable thermoplastic composite materials are also graft (co)polymers. These include graft (co)polymers with rubber-elastic properties, which are obtainable essentially from at least 2 of the following monomers:

Chloroprene, butadiene-1,3, isoprepene, styrene, acrylonitrile, ethylene, propylene, vinyl acetate and (meth) acrylic acid ester with 1 to 18 carbon atoms in the alcohol component; that is, polymers such as those described, e.g. in "Methoden der Organischen Chemie" (Houben-Weyl), vol. 14/1, Georg Thieme-Verlag, Stuttgart 1961, pp. 393–406 and in C. B. Bucknall, "Toughened Plastics", Appl. Science Publishers, London 1977. Preferred graft polymers are partially crosslinked and have gel contents of more than 20 wt. %, preferably over 40 wt. % and particularly over 60 wt. %.

Preferred graft (co)polymers include graft (co)polymers C of:

C.1 5 to 95, preferably 30 to 80 parts by wt. of a mixture of
- C.1.1 50 to 99 parts by wt. of styrene, α-methylstyrene, halogen or methyl ring-substituted styrenes, methylmethacrylate or mixtures of said compounds, and
- C.1.2 1 to 50 parts by wt. of acrylonitrile, methacrylonitrile, methylmethacrylate, maleic anhydride, $C_1$–$C_4$-alkyl or phenyl-N-substituted maleinimides or mixtures of said compounds, C.2 5 to 95, preferably 20 to 70 parts by wt. of polymer based on diene and/or alkyl acrylate with a glass transition temperature of <10° C., preferably <–10° C.

Preferred graft (co)polymers are substrates C.2. grafted e.g. with styrene and/or acrylonitrile and/or (meth)acrylic acid alkyl esters such as polybutadienes, butadiene/styrene copolymer and acrylate rubbers; i.e. (co)polymers of the kind described in DE-OS 1 694 173 (=U.S. Pat. No. 3,564,077); polybutadienes grafted with acrylic or methacrylic acid alkyl esters, vinyl acetate, acrylonitrile, styrene and/or alkylstyrenes, butadiene/styrene or butadiene/acrylonitrile (co)polymers, polyisobutenes or polyisoprenes, of the kind described in e.g. DE-OS 2 348 377 (=U.S. Pat. No. 3,919,353).

Particularly preferred polymers are e.g. ABS polymers of the kind described e.g. in DE-OS 2 035 390 (=U.S. Pat. No. 3,644,574) or in DE-OS 2 248 242 (=GB PS 1 409 275).

Particularly preferred graft (co)polymers are obtainable by a grafting reaction of α 10 to 70, preferably 15 to 50, particularly 20 to 40 wt. %, based on graft copolymer, of at least one (meth)acrylic acid ester or 10 to 70, preferably 15 to 50, particularly 20 to 40 wt. % of a mixture of 10 to 50, preferably 20 to 35 wt. %, based on mixture, of acrylonitrile or (meth)acrylic acid ester and 50 to 90, preferably 65 to 80 wt. %, based on mixture, of styrene as graft side chain C.1, onto β 30 to 90, preferably 50 to 85, particularly 60 to 80 wt. %, based on graft copolymer, of a butadiene polymer with at least 50 wt. %, based on β, of butadiene radicals as graft substrate C.2, where preferably the gel proportion of the graft substrate β is at least 70 wt. % (measured in toluene), the degree of grafting G is 0.15 to 0.55 and the average particle diameter $d_{50}$ of the graft polymer C.2 is 0.05 to 2 μm, preferably 0.1 to 0.6 μm.

(Meth)acrylic acid esters α are esters of acrylic acid or methacrylic acid and monohydric alcohols with 1 to 18 carbon atoms. Methyl, ethyl and propyl esters of methacrylic acid, n-butylacrylate, t-butylacrylate and t-butylmethacrylate are particularly preferred.

The graft substrate β may contain, in addition to butadiene radicals, up to 50 wt. %, based on β, of radicals of other ethylenically unsaturated monomers such as styrene, acrylonitrile, esters of acrylic or methacrylic acid with 1 to 4 carbon atoms in the alcohol component (such as methylacrylate, ethylacrylate, methylmethacrylate, ethylmethacrylate), vinyl esters and/or vinyl ethers. The preferred graft substrate β is composed of pure polybutadiene.

As it is well known that the graft monomers are not necessarily fully grafted onto the graft substrate during the grafting reaction, the term graft (co)polymers according to the invention is also taken to mean those products that are obtained by polymerisation of graft monomers in the presence of the graft substrate.

The degree of grafting G designates the weight ratio of grafted graft monomers to the graft substrate and is dimensionless.

The average particle size $d_{50}$ is the diameter above and below which 50 wt. % of the particles lie in each case. It may be determined by an ultracentrifuge measurement (W. Scholtan, H. Lange, Kolloid Z. and Z. Polymere 250 (1972), 782–796).

Particularly preferred polymers are. e.g. also graft polymers of

τ 20 to 90 wt. %, based on the graft polymer, of acrylate rubber with a glass transition temperature of <–20° C. as graft substrate C.2 and δ 10 to 80 wt. %, based on the graft polymer, of at least one polymerisable, ethylenically unsaturated monomer.

The polyacrylate rubbers τ of the graft polymers are preferably polymers of acrylic acid alkyl esters, optionally with up to 40 wt. %, based on τ, of other polymerisable, ethylenically unsaturated monomers. The preferred polymerisable acrylic acid esters include $C_1$–$C_8$-alkyl esters, for example, methyl-, ethyl-, butyl-, n-octyl- and 2-ethylhexyl esters; halogen alkyl esters, preferably halogen-$C_1$–$C_8$-alkyl esters, such as chloroethylacrylate and mixtures of said monomers.

For the purpose of crosslinking, monomers with more than one polymerisable double bond may be copolymerised. Preferred examples of crosslinking monomers are esters of unsaturated monocarboxylic acids with 3 to 8 carbon atoms and unsaturated monohydric alcohols with 3 to 12 carbon atoms or saturated polyols with 2 to 4 OH groups and 2 to 20 carbon atoms, such as, e.g. ethylene glycol dimethacrylate, allylmethacrylate; polyunsaturated heterocyclic compounds such as, e.g. trivinyl and triallylcyanurate; polyfunctional vinyl compounds such as di- and trivinylbenzenes; and also triallylphosphate and diallylphthalate.

Preferred crosslinking monomers are allylmethacrylate, ethylene glycol dimethacrylate, diallylphthalate and heterocyclic compounds having at least 3 ethylenically unsaturated groups.

Particularly preferred crosslinking monomers are the cyclic monomers triallylcyanurate, triallylisocyanurate, trivinylcyanurate, triacryloylhexahydro-s-triazine, triallylbenzenes.

The amount of crosslinked monomers is preferably 0.02 to 5, particularly 0.05 to 2 wt. %, based on the graft substrate τ.

In the case of cyclic crosslinking monomers with at least 3 ethylenically unsaturated groups, it is advantageous to limit the quantity to less than 1 wt. % of the graft substrate τ.

Preferred "other" polymerisable, ethylenically unsaturated monomers which, in addition to the acrylic acid esters, may optionally be used for the preparation of the graft substrate τ, are e.g. acrylonitrile, styrene, α-methylstyrene, acrylamides, vinyl-$C_1$–$C_6$-alkylethers, methylmethacrylate, butadiene. Polyacrylate rubbers preferred as graft substrate τ are emulsion polymers with a content of at least 60 wt. %.

Further suitable graft substrates according to C.2 are silicone rubbers with active grafting sites of the kind described in DE-OS 3 704 657, DE-OS 3 704 655, DE-OS 3 631 540 and DE-OS 3 631 539.

The gel content of the graft substrate C.2 is determined at 25° C. in dimethylformamide (M. Hoffmann, H. Krömer, R. Kuhn, Polymeranalytik I and II, Georg Thieme-Verlag, Stuttgart 1977).

The graft copolymers may be prepared according to known processes such as bulk, suspension, emulsion or bulk-suspension processes.

Moreover, thermoplastic polyesters are suitable as thermoplastic material for the composites according to the invention.

Polyesters that may be used are reaction products of aromatic dicarboxylic acids or their reactive derivatives e.g. dimethyl esters or anhydrides and aliphatic, cycloaliphatic or arylaliphatic diols and mixtures of such reaction products.

Preferred polyalkylene terephthalates may be prepared according to known methods from terephthalic acids or their reactive derivatives and aliphatic and cycloaliphatic diols with 2 to 10 carbon atoms (Kunststoff-Handbuch, volume VIII, p. 695 ff, Carl Hanser Verlag, Munich 1973).

Preferred polyalkylene terephthalates contain 80 to 100, preferably 90 to 100 mole-%, based on the dicarboxylic acid component, of terephthalic acid radicals and 80 to 100, preferably 90 to 100 mole-%, based on the diol component, of ethylene glycol and/or butane-1,4-diol radicals. In addition to terephthalic acid esters, esters of other aromatic dicarboxylic acids with 8 to 14 carbon atoms or aliphatic dicarboxylic acids with 4 to 12 carbon atoms are suitable, such as phthalic acid, isophthalic acid, naphthalene-2,6-dicarboxylic acid, 4,4'-diphenyldicarboxylic acid, succinic, adipic, sebacic, azelaic or cyclohexane diacetic acid or mixtures thereof. In addition to ethylene glycol and/or butane-1,4-diol, other aliphatic diols with 3 to 12 carbon atoms are suitable such as pentane-1,5-diol, hexane-1,6-diol, cyclohexane dimethanol-1,4, 3-methylpentane-1,3- and 1,6-diol, 2-ethylhexane-1,3-diol, 2,2-diethylpropane-1,3-diol, hexane-2,5-diol, 1,4-(di(β-hydroxyethoxyphenyl) propane, 2,4-dihydroxy-1,1,3,3-tetramethylcyclobutane, 2,2-bis-(3β-hydroxyethoxyphenyl) propane and 2,2-bis-(4-hydroxypropoxyphenyl) propane (DE-OS 2 407 647, 2 407 776, 2 715 932) or mixtures thereof.

The polyesters, particularly polyalkylene terephthalates, may be branched by incorporation of relatively small quantities of tri- or tetrahydric alcohols or 3- or 4-basic carboxylic acid, of the kind described in DE-OS 1 900 270 and U.S. Pat. No. 3,692,744. Examples of preferred branching agents are trimesic acid, trimellitic acid, trimethylolethane and -propane, and pentaerythritol. It is advisable to use not more than 1 mole-% of the branching agent, based on the acid component.

Polyalkylene terephthalates prepared from terephthalic acid or reactive derivatives thereof e.g. their dialkyl esters and ethane diol and/or butane-1,4-diol (polyethylene terephthalate, polybutylene terephthalate), and mixtures thereof are particularly preferred.

Preferred polyalkylene terephthalates are also copolyesters prepared from at least two of the above-mentioned diols; particularly preferred copolyesters are poly-(ethylene glycol/butane-1,4-diol) terephthalates. The various diol radicals may be in the form of blocks or randomly distributed in the copolyesters.

The polyesters generally have a limiting viscosity number of 0.4 to 1.4 dl/g, preferably 0.5 to 1.3 dl/g, particularly 0.6 to 1.2 dl/g, measured in phenol/o-dichlorobenzene (1:1 parts by wt.) at 25° C. in each case.

The thermoplastic polyamides that may be used for the composites according to the invention are polyamide 66 (polyhexamethylene adipinamide) or polyamides of cyclic lactams with 6 to 12 carbon atoms, preferably of laurinlactam and particularly preferably ε-caprolactam=polyamide 6 (polycaprolactam) or copolyamides with main constituents 6 or 66 or compounds with main constituent of the polyamides mentioned. Polyamide 6 prepared by activated anionic polymerisation, or copolyamide with main constituent polycaprolactam prepared by activated anionic polymerisation is preferred.

The activated anionic polymerisation of lactams to polyamides is carried out on an industrial scale in such a way that a solution of catalyst in lactam, optionally with impact strength modifier, is prepared on the one hand and a solution of activator in lactam on the other hand, both solutions usually having a composition such that a combined feed in the same ratio produces the desired overall formulation. This is not, however, necessary. It is also possible to choose other compositions, for example, to meter a concentrated activator and catalyst melt into a lactam melt. Further additives may be introduced into the activator, catalyst or optionally lactam melt, depending on compatibilities.

Polymerisation takes place by mixing the individual solutions to obtain the overall formulation at 80° C. to 200° C., preferably 100° C. to 140° C.

The catalyst is an alkali metal or alkaline earth metal lactamate, preferably as a solution in lactam, particularly preferably sodium caprolactamate in ε-caprolactam.

The activator within the context of the invention may be N-acyl lactams or acid chlorides or, preferably, aliphatic isocyanates, particularly preferably oligomers of hexamethylene diisocyanate. Both the pure substance and preferably a solution, for example, in N-methylpyrrolidone, may be used as activator.

Mixtures of at least
1 to 99, preferably 10 to 90, particularly preferably 20 to 80 parts by wt., of at least one of the polycarbonates mentioned,
0 to 50, preferably 1 to 50, particularly preferably 2 to 30, particularly preferably 8 to 25 parts by wt., of at least one of the styrene copolymers mentioned,
and
1 to 99, preferably 7 to 80, particularly preferably 10 to 70 parts by wt., of one or more of the graft polymers mentioned
are used in particular preference as thermoplastic material A.

Extremely fine particle inorganic compounds (powders) are composed of compounds of one or more metals of the 1st to the 5th main group and the 1st to the 8th subsidiary group of the Mendeleev Periodic System, preferably the 2nd to the 5th main group or the 4th to the 8th subsidiary group, particularly preferably the 3rd to the 5th main group or the 4th to the 8th subsidiary group with at least one element selected from the group oxygen, sulfur, boron, phosphorus, carbon, nitrogen, hydrogen or silicon.

Preferred compounds are, for example, oxides, hydroxides, water-containing oxides, sulfates, sulfites, sulfides, carbonates, carbides, nitrates, nitrites, nitrides, borates, silicates, phosphates, hydrides, phosphites or phosphonates.

Preferred extremely fine particle inorganic compounds are, for example, TiN, $TiO_2$, $SnO_2$, WC, ZnO, $Al_2O_3$, AlO(OH), $ZrO_2$, $Sb_2O_3$, $SiO_2$, iron oxides, $NaSO_4$, $BaSO_4$, vanadium oxides, zinc borate, silicates such as Al silicates, Mg silicates, uni-, two- and three-dimensional silicates. Mixtures and doped compounds may also be used. Moreover, these nano-scale particles may be surface-modified with organic molecules in order to obtain better compatibility with the matrix. In this way, hydrophobic or hydrophilic organic surfaces may be obtained.

The average particle diameters are smaller than 200 nm, preferably less than 150 nm, particularly 1 to 100 nm, more particularly preferably 1 to 70 nm.

Particle size and particle diameter always means the average particle diameter $d_{50}$ determined by ultracentrifuge measurements according to W. Scholtan et at., Kolloid-Z. and Z. Polymere 250 (1972), pp 782 to 796.

The inorganic compounds may take the form of powders, pastes, sols, dispersions or suspensions. Powders may be obtained from dispersions, sols or suspensions by precipitation.

The powders may be incorporated in the thermoplastic materials according to conventional processes, for example, by direct kneading or extrusion of the constituents of the molding compound and the extremely fine particle inorganic powders. Preferred processes are the preparation of a masterbatch, e.g. in additives, monomers, solvents or in thermoplastic A, the co-precipitation of dispersions of component A with dispersion, suspensions, pastes or sols of the extremely fine particle inorganic materials.

The molding compounds according to the invention may contain at least one of the conventional additives, such as lubricants and mold release agents, nucleating agents, antistatic agents, stabilisers and coloring agents and pigments.

The inorganic powder is incorporated in the thermoplastic material in quantities of 0.5 to 50, preferably 1 to 25, particularly preferably 3 to 15 wt. %, based on the thermoplastic material A.

According to the invention, thermoplastic, foamed or solid polyurethane materials or preferably molded parts may be prepared in a sandwich construction.

The polyurethanes or polyurethane ureas or polyureas used according to the invention are obtained by reaction of polyisocyanates with H-active polyfunctional compounds, preferably polyols.

Suitable polyisocyanates are preferably those that are known from polyurethane chemistry and are conventionally used in that context. These are, in particular, polyisocyanates on an aromatic basis, e.g. 2,4-diisocyanatotoluene, the industrial mixtures thereof with 2,6-diisocyanatotoluene, 4,4'-diisocyanatodiphenylmethane, the mixtures thereof with the corresponding 2,4'- and 2,2'- isomers, polyisocyanate mixtures of the diphenylmethane series, of the kind that may be obtained in an inherently known way by phosgenation of aniline/formaldehyde condensates, the modification products of said industrial polyisocyanates having biuret or isocyanate groups, and in particular, NCO prepolymers of the kind mentioned based on said industrial polyisocyanates on the one hand, and the simple polyols and/or polyether polyols and/or polyester polyols mentioned by way of example in the case of component B described below on the other hand, and also any mixtures of such isocyanates, provided they are sufficiently stable in storage.

Relatively high molecular weight modified polyisocyanates of particular interest include the prepolymers known from polyurethane chemistry with terminal isocyanate groups in the molecular weight range of 400 to 10,000, preferably 600 to 8,000 and particularly 800 to 5,000. These compounds are prepared in an inherently known way by reaction of excess quantities of simple polyisocyanates of the kind mentioned by way of example with organic compounds with at least two groups that are reactive towards isocyanate groups, particularly organic polyhydroxyl compounds.

Suitable polyhydroxyl compounds of this kind are both simple polyhydric alcohols in the molecular weight range from 82 to 599, preferably 62 to 200, such as, e.g. ethylene glycol, trimethylol propane, propane-1,2-diol or butane-1,4-diol, or butane-2,3-diol, but in particular relatively high molecular weight polyether polyols and/or polyester polyols of the kind inherently known from polyurethane chemistry with molecular weights from 600 to 8,000, preferably 800 to 4,000, which have at least two, usually 2 to 8, but preferably 2 to 4 primary and/or secondary hydroxyl groups. Naturally, it is also possible to use NCO prepolymers which were obtained, for example, from low molecular weight polyisocyanates of the kind mentioned by way of example and less preferred compounds with groups that are reactive towards isocyanate groups, such as, e.g. polythioether polyols, hydroxyl group-containing polyacetals, polyhydroxypolycarbonates, hydroxyl group-containing polyester amides or hydroxyl group-containing copolymers of olefinically unsaturated compounds.

Compounds with groups that are reactive towards isocyanate groups, particularly hydroxyl groups, suitable for the preparation of NCO prepolymers, are, for example, the compounds disclosed by way of example in U.S. Pat. No. 4,218,543, column 7, line 29 to column 9, line 25. During the preparation of NCO prepolymers, these compounds with groups that are reactive towards isocyanate groups are caused to react with simple polyisocyanates of the kind mentioned above by way of example whilst maintaining an NCO excess. The NCO prepolymers generally have an NCO content of 10 to 25, preferably 15 to 22 wt. %. It follows from this that, within the scope of the present invention, the term "NCO prepolymers" and "prepolymers with terminal isocyanate groups" means both the reaction products as such and their mixtures with excess quantities of unreacted starting polyisocyanates which are often also called "semi-prepolymers".

Polyester polyols of the kind which can be obtained in an inherently known way by reaction of low molecular weight alcohols with polyvalent carboxylic acids such as adipic acid, phthalic acid, hexahydrophthalic acid, tetrahydrophthalic acid, or the anhydrides of these acids are also suitable, provided that the viscosity of the H-active component does not become too high. A preferred polyol having ester groups is castor oil. In addition, preparations with castor oil, of the kind that may be obtained by dissolution of resins e.g. of aldehyde ketone resins, and modifications of castor oil and polyols based on other natural oils are also suitable.

Relatively high molecular weight polyhydroxy polyethers in which high molecular weight polyadducts and polycondensates or polymers are present in the fine particle, dissolved or grafted form are also suitable. Such modified polyhydroxyl compounds are obtained, e.g., if polyaddition reactions (e.g. reactions between polyisocyanates and amino-functional compounds) or polycondensation reactions (e.g. between formaldehyde and phenols and/or amines) are allowed to take place in situ in the compounds containing hydroxyl groups. Such processes are described, for example, in DE-AS 1 168 075 and 1 280 142 and DE-A 2 324 134, 2 423 984, 2 512 385, 2 513 815, 2 550 796, 2 550 797, 2 550 833, 2 550 882, 2 633 293 and 2 639 254. According to U.S. Pat. No. 3,869,413 and DE-A-2 550 860, it is also possible, however, to mix a finished aqueous polymer dispersion with a polyhydroxyl compound and then to remove the water from the mixture.

Polyhydroxyl compounds modified by vinyl polymers, of the kind obtained e.g. by polymerisation of styrene and acrylonitrile in the presence of polyethers (U.S. Pat. Nos. 3,383,351, 3,304,273, 3,523,093, 3,110,695; DE-A-1 152 5369) or polycarbonate polyols (DE-PS 1 769 795; U.S. Pat.

No. 3,637,909) are also suitable for the preparation of polyurethanes. If polyether polyols which were modified according to DE-A-2 442 101, 2 844 922 and 2 646 141 by graft polymerisation with vinyl phosphonic acid esters and optionally (meth)acrylonitrile, (meth)acrylamide or OH-functional (meth)acrylic acid esters are used, plastics with particular flame resistance are obtained.

Representatives of the above-mentioned compounds to be used as H-active compounds are described, e.g., in High Polymers, Vol. XVI, "Polyurethanes Chemistry and Technology", edited by Saunders-Frisch, Interscience Publishers, New York, London, Volume 1, 1982, pages 32 to 42 and pages 44 to 54 and Volume II, 1984, pages 5 to 6 and 198 to 199, and in Kunststoff-Handbuch, Volume VII, Carl Hanser Verlag, Munich, 1983, e.g. on pages 45 to 61.

Of course, mixtures of the compounds listed may also be used.

The limit of the average OH number and average functionality of the H-active component is established in particular by the increasing embrittlement of the resulting polyurethane. In principle, however, the expert is familiar with the potential influences on the physical polymer properties of the polyurethane, so NCO component, aliphatic diol and polyol may be matched to one another in a favourable manner.

All inherently known auxiliaries and additives such as, e.g. release agents, blowing agents, fillers, catalysts and flame retardants may be used.

In the event that foamed materials are to be prepared, the reaction mixture may be introduced into a mold in an inherently known way. The expandable reaction mixture foams in the mold and forms the molded part. Form molding may be carried out in such a way that the molded part has a cellular structure on its surface. It may also, however, be carried out in such a way that the molded part has a compact skin and a cellular core (integral foams). Polyurethane foams may also be prepared as slabstock foam.

The preparation of polyurethane composite parts in a sandwich construction is also preferred. The process may be designed both as a sandwich or envelope process. Both the sandwich construction and the envelope construction are inherently known. In the sandwich process (filled structure), two half-shells (e.g. outer layers of plastics) are prepared beforehand, placed in a mold and the cavity between the shells is foamed with the PUR foam. In the envelope construction, a core of PUR foam is placed in a mold and then enveloped with a suitable envelope material, e.g. with one of the above-mentioned thermoplastics. The envelope construction is preferred for the preparation of sandwich composite parts.

Thermoplastic polyurethanes according to the present invention are reaction products of diisocyanates, wholly or predominantly aliphatic oligo- and/or polyesters and/or -ethers, and one or more chain extenders. These thermoplastic polyurethanes are essentially linear and have thermoplastic processing characteristics.

The thermoplastic polyurethanes are either well known or may be prepared by known processes (see, for example, U.S. Pat. No. 3,214,411, J. H. Saunders and K. C. Frisch, "Polyurethanes, Chemistry and Technology", vol. II, pages 299 to 451, Interscience Publishers, New York, 1964 and Mobay Chemical Corporation, "A Processing Handbook for Texin Urethane Elastoplastic Materials", Pittsburgh, Pa.).

Starting materials for the preparation of oligoesters and polyesters are, for example, adipic acid, succinic acid, suberic acid, sebacic acid, oxalic acid, methyladipic acid, glutaric acid, pimelic acid, azelaic acid, phthalic acid, terephthalic acid and isophthalic acid.

Adipic acid is preferred in this case.

Suitable glycols for the preparation of oligoesters and polyesters are, for example, ethylene glycol, 1,2- and 1,3-propylene glycol, butane-1,2-, 1,3-, 1,4-, 2,3-, 2,4-diol, hexane diol, bishydroxymethylcyclohexane, diethylene glycol and 2,2-dimethylpropylene glycol. Moreover, small quantities of up to 1 mole-% of trifunctional or higher functionality alcohols e.g. trimethylol propane, glycerol, hexane triol etc. may be used together with the glycols.

The resulting hydroxyl oligoesters or polyesters have a molecular weight of at least 600, a hydroxyl number of about 25 to 190, preferably about 40 to 150, an acid value of about 0.5 to 2 and a water content of about 0.01 to 0.2%.

Oligoesters and polyesters are also oligomeric or polymeric lactones, such as, for example, oligocaprolactone or polycaprolactone, and aliphatic polycarbonates such as, for example, polybutane diol-(1,4-)-carbonate or polyhexane diol-(1,6)-carbonate.

A particularly suitable oligoradical which may be used as a starting material for the thermoplastic polyurethanes is prepared from adipic acid and a glycol which has at least one primary hydroxyl group. Condensation is ended when an acid value of 10, preferably about 0.5 to 2 is reached. The water produced during the reaction is thus separated at the same time or afterwards so that the water content at the end lies in the region of approximately 0.01 to 0.05%, preferably 0.01 to 0.02.

Oligoethers and polyethers for the preparation of the thermoplastic polyurethanes according to component B are, for example, those based on tetramethylene glycol, propylene glycol and ethylene glycol.

Polyacetals are also to be understood as polyethers and may be used as such.

The oligoethers and polyethers should have an average molecular weight n (number-average, determined by way of the OH number of the products) of 600 to 2,000, preferably 1,000 to 2,000.

The organic diisocyanate used for the preparation of the polyurethanes according to component B is preferably 4,4'-diphenylmethane diisocyanate. It should contain less than 5% of 2,4'-diphenylmethane diisocyanate and less than 2% of the dimer of diphenylmethane diisocyanate. It is also desirable that the acidity, calculated as HCl, be in the region of about 0.005 to 0.2%. The acidity, calculated as HCl, is determined by extraction of chloride from the isocyanate in hot, aqueous methanol solution or by liberation of the chloride on hydrolysis with water and titration of the extract with standard silver nitrate solution in order to obtain the chloride ion concentration present therein.

Other diisocyanates may also be used for the preparation of the thermoplastic polyurethanes according to component B, for example, the diisocyanates of ethylene, ethylidene, propylene, butylene, cyclopentylene-1,3, cyclohexylene-1, 4,cyclohexylene-1,2, 2,4-toluene, 2,6-toluene, p-phenylene, n-phenylene, xylene, 1,4-naphthylene, 1,5-naphthylene, 4,4'-diphenylene, 2,2-diphenylpropane-4,4'-diisocyanate, azobenzene-4,4'-diisocyanate, diphenylsulfone-4,4'-diisocyanate, dichlorohexane methylene diisocyanate, pentamethylene diisocyanate, hexamethylene diisocyanate, 1-chlorobenzene-2,4-diisocyanate, furfuryl diisocyanate, dicyclohexylmethane diisocyanate, isophorone diisocyanate, diphenylmethane diisocyanate and bis(-isocyanatophenyl) ethers of ethylene glycol, butane diol, etc.

Chain extenders that may be used are organic difunctional compounds containing active hydrogen that is reactive with isocyanates, e.g. diols, hydroxycarboxylic acids, dicarboxylic acids, diamines and alkanolamines and water. Such compounds, include, for example, ethylene-, propylene-, butylene glycol, butane-1,4-diol, butane diol, butyne diol, xylylene glycol, amylene glycol, 1,4-phenylene-bis-β-hydroxyethylether, 1,3-phenylene-bis-β-hydroxyethylether, bis-(hydroxymethyl cyclohexane), hexane diol, adipic acid, hydroxycaproic acid, thiodiglycol, ethylene diamine-, propylene-, butylene-, hexamethylene-, cyclohexylene-, phenylene-, toluene-, xylylene diamine, diaminodicyclohexylmethane, isophorone diamine, 3,3'-dichlorobenzidine, 3,3'-dinitrobenzidine, ethanolamine, aminopropyl alcohol, 2,2-dimethylpropanolamine, 3-aminocyclohexyl alcohol and p-aminobenzyl alcohol. The molar ratio of oligoester or polyesters to difunctional chain extenders is from 1:1 to 1:50, preferably 1:2 to 1:30.

Apart from difunctional chain extenders, trifunctional or more than trifunctional chain extenders may also be used in minor quantities up to about 5 mole-%, based on moles of difunctional chain extenders used.

Such trifunctional or more than trifunctional chain extenders are, for example, glycerol, trimethylol propane, hexane triol, pentaerythritol, and triethanolamine.

Monofunctional components, for example, butanol, may also be used for the preparation of the thermoplastic polyurethanes according to component B.

The diisocyanates, oligoesters, polyesters, polyethers, chain extenders and monofunctional components mentioned as building blocks for the thermoplastic polyurethanes are either known from the literature or may be obtained according to processes known from the literature.

The well known preparation of polyurethanes may be carried out, for example, as follows:

For example, the oligoesters and polyesters, the organic diisocyanates and the chain extenders may be heated by themselves, preferably to a temperature of about 50 to 220° C. and then mixed. The oligoesters and polyesters are preferably heated individually first, then mixed with the chain extenders and the mixture obtained mixed with the preheated isocyanate.

The mixing of the starting components for the preparation of the polyurethanes may be carried out with any mechanical stirrer that permits intensive mixing within a short period. If the viscosity of the mixture during stirring should prematurely rise too rapidly, the temperature may either be lowered or a small quantity (0.001 to 0.05 wt. %, based on ester) of citric acid or similar may be added in order to reduce the rate of the reaction. Suitable catalysts such as, e.g. tertiary amines, which are mentioned in U.S. Pat. No. 2,729,618, may be used to increase the rate of reaction.

EXAMPLES

A1

Linear polycarbonate based on bisphenol A with a relative solution viscosity of 1.252 measured in $CH_2Cl_2$ as solvent at 25° C. and in a concentration of 0.5 g/100 ml.

A2

Styrene-acrylonitrile copolymer with a styrene-acrylonitrile ratio of 72:28 and a MFR (melt flow ratio) of 12.5 g/10 min, measured at 23.0° C. and a weight of 3.8 kg.

A3

Graft polymer of 40 parts by wt. of a copolymer of styrene and acrylonitrile in a ratio of 73:27 on 60 parts by wt. of a particulate crosslinked polybutadiene rubber (average particle size $d_{50}=0.3$ μm), prepared by emulsion polymerisation.

AlO (OH) as polar compound, (Plural 200 from Condea, Hamburg);

PETS (pentaerythritol tetrastearate) as mold release agent;

polyurethane foam system: Bayfill 51 IF 02 P from Bayer AG, Leverkusen, Germany.

Preparation and Testing of the Composites According to the Invention

The mixing of components A1, A2, A3, PETS and optionally AlO (OH) takes place in a 3 1 internal mixer at temperatures of 220 to 240° C. On an injection molding machine of the Arburg 270 E type, molded parts (sheets) with the dimensions 150×105×3.2 mm are prepared from this mixture at a mass temperature of 260° C., which are then coated in a known way with a conventional commercial polyurethane foam system of the Bayfill 51IF02P type. After the foaming reaction has ended, the test under changing climatic conditions described below is carried out with the composite sheets.

Test Under Changing Climatic Conditions

In order to assess the bond adhesion, a test under changing climatic conditions is carried out in which the composites are exposed to temperatures of −40° C. to +80° C. at a rate of temperature change of 1 K/min. A 4 hour continuous period at the limiting temperatures mentioned in each case and a relative humidity of 80% at T=+80° C. is maintained. After 12 temperature cycles, the bond adhesion between the thermoplastic material and the PU material is measured by applying a force until such time as the bond ruptures. If the bond ruptures in the PU material, the bond adhesion is rated (+). If the composite materials separate before the PU material ruptures, the bond adhesion is rated (−).

TABLE 1

| Example | A | 1 | 2 |
| Thermoplastic mixture [parts by wt.] | | (Comparison) | |
| --- | --- | --- | --- |
| A1 | 58 | 55.2 | 52.7 |
| A2 | 24 | 22.9 | 21.8 |
| A3 | 18 | 17.1 | 16.4 |
| AlO (OH) | — | 4.8 | 9.1 |
| PETS | 0.75 | 0.75 | 0.75 |
| PU foam system 51IF02P | x | x | x |
| Thickness of PU foam (mm) | 5 | 5 | 5 |
| Bond adhesion in test under changing climatic conditions | (−) | (+) | (+) |

As the tests according to Table 1 show, the composites according to the invention exhibit excellent bond adhesion.

What is claimed is:

1. A composite of at least two different plastics materials joined directly to one another comprising:

A) one of a thermoplastic polymer and a thermoplastic mixture of polymers, which contain at least one polar compound of at least one of the metals of the 1st to the 5th main group or of the 1st to the 8th subsidiary group of the Periodic System as an extremely fine particle inorganic powder; and B) a polyurethane, wherein the particles have average diameter smaller than 200 nm.

2. The composite of claim 1 wherein component A is selected from at least one of the following polymers: polycarbonate, polyester carbonate, polyester, styrene copolymer, graft polymer and polyamide.

3. The composite of claim 1 wherein the polar compound is a polar compound of at least one of the metals of the 2nd to the 5th main group or of the 4th to the 8th subsidiary group of the Periodic System.

4. The composite of claim 3 wherein the polar compound is an oxide, optionally containing water, sulfate, sulfite, carbonate, hydroxide, carbide, nitrate, nitrite, nitride, borate, silicate, phosphate, hydride, phosphite or phosphonates or mixtures thereof.

5. The composite of claim 4 wherein the metal is selected from at least one of titanium, aluminum, silicon, tin, zinc and zirconium.

6. The composite of claim 1 wherein the proportion of the polar compound is 0.5 to 50 parts by wt., based on the thermoplastic material A.

7. The composite of claim 1 wherein the thermoplastic polymer A) contains additives selected from at least one of lubricants, release agents, nucleating agents, antistatic agents, stabilisers and pigments.

8. A composite according to claim 1, wherein the polyurethane has a form selected from a foam, a coating and a solid material.

9. A moulded part prepared from a composite according to claim 1.

10. A process for the preparation of the composite of claim 1, wherein the inorganic powder is introduced into component A in an extremely finely divided form, and the polyurethane system is applied to and allowed to react with said material without the application of an adhesion promoting layer.

11. A material system comprising (i) a sheet prepared of at least one thermoplastic resin and (ii) polyurethane foam adhering to at least one surface of said sheet, said thermoplastic resin containing at least one polar compound of a metal selected from the second to fifth main groups and the first to the eighth subsidiary groups of the periodic table of the elements, said compound having an average particle size of 1 to 100 nm.

12. The material system of claim 11 wherein polar compound is AlO(OH).

13. A process for the preparation of a composite according to claim 1 wherein the inorganic powder is introduced into component A by direct kneading or by extrusion and the polyurethane is applied as a reaction system and allowed to react with said material without the application of heat.

14. The composite of claim 1 wherein the particles have average diameter of 1 to 100 nm.

15. The composite of claim 1 wherein the particles have average diameter of 1 to 70 nm.

16. The composite of claim 1 wherein said polar compound is selected from at least one of TiN, $TiO_2$, $SnO_2$, WC, ZnO, $Al_2O_3$, AlO(OH), $ZrO_2$, $Sb_2O_3$, $SiO_2$, iron oxides, $NaSO_4$, $BaSO_4$, vanadium oxides, zinc borate and silicates.

17. The composite of claim 16 wherein the silicates are selected from at least one of uni-dimensional silicates, two-dimensional silicates and three-dimensional silicates.

18. The composite of claim 17 wherein the silicates are selected from at least one of Al silicates and Mg silicates.

* * * * *